Nov. 4, 1941.   H. F. TÖNNIES   2,261,532
PHOTOGRAPHIC APPARATUS
Filed Nov. 8, 1938
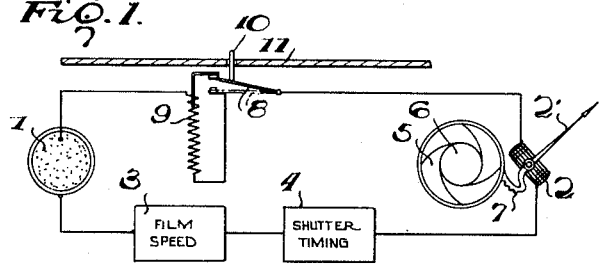
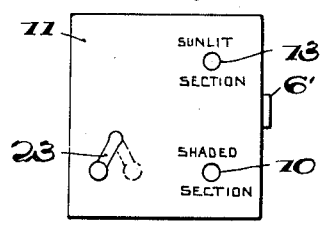
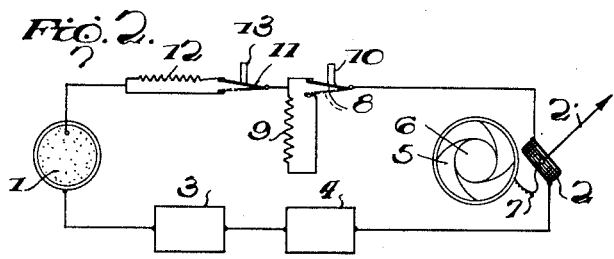
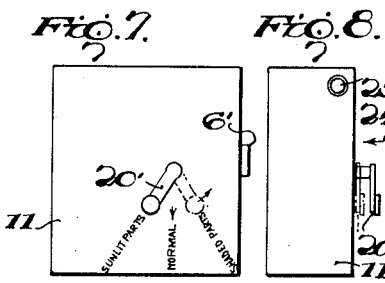
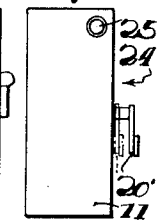
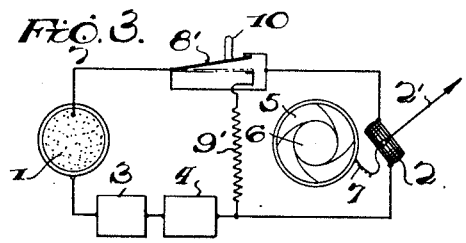
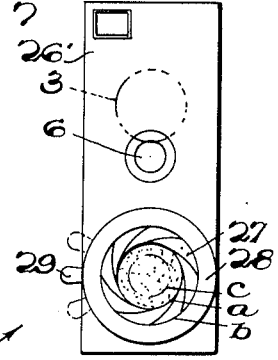
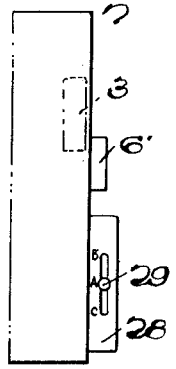
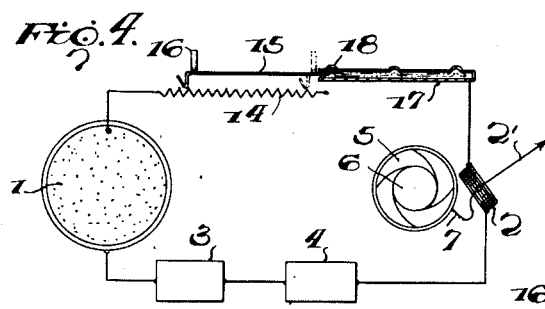
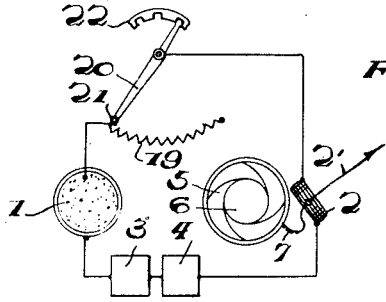
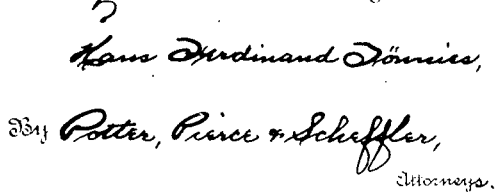

Patented Nov. 4, 1941

2,261,532

UNITED STATES PATENT OFFICE 2,261,532

PHOTOGRAPHIC APPARATUS

Hans Ferdinand Tönnies, Hamburg-Grossflottbek, Germany

Application November 8, 1938, Serial No. 239,559

2 Claims. (Cl. 95—64)

This invention relates to photographic apparatus of the type in which the diaphragm or shutter is set with the help of a galvanometer or electric device that is actuated by the current output of a photocell which receives light from the scene to be photographed. It relates especially to still and motion picture cameras in which the opening of the diaphragm is automatically adjusted to the appropriate size by the photocell and galvanometer.

It is now a well known fact in photography that it is impossible to show in a picture all the differences in the light values in the sunlit and in the shadow parts of a scene. When a photographer is confronted with the problem of taking a picture of a scene having large areas in the sunshine and other areas in shadow, there are three main possibilities open to him:

(1) He may make an "average" exposure based on the average brightness of the complete scene. The resultant negative will not record all of the gradations of light values that can be discerned by the eye as the brilliantly lighted parts are over-exposed and the shadowy parts are under-exposed.

(2) He may time the exposure to obtain a more accurate rendition of the gradations of light values in the shadowy portion of the scene. This necessitates a longer exposure than for condition (1) and the sunlit portions of the scene will be greatly overexposed, but there will be a better rendition of the details in the shadowed parts of the scene.

(3) He may time the exposure to obtain a more accurate rendition of the gradations of light values in the sunlit portion of the scene. This calls for a shorter exposure than for condition (1) and results in under-exposure in the shadowed parts but an accurate rendition of values in the sunlit parts.

The problem of obtaining the exposure conditions for a correct rendition of the important features of the picture is particularly difficult when taking motion pictures as the photoelectric exposure-determining system responds to the average brightness of the complete scene. The light values of the pictorially important features may vary over a wide range without affecting the average brightness of a scene of great brightness contrast when, for example, a group of people move from bright sunlight into deep shade. An average exposure under condition (1) will not give a satisfactory picture of the people either in the sunlight or in the shade as the average scene brightness is not a measure of the average brightness of the important features of the scene.

An object of this invention is to provide photographic apparatus having a photoelectric system for the automatic or semi-automatic setting of the shutter or diaphragm, and an adjustable device for altering the action of the photoelectric system to obtain proper exposure of the important features when the scene has areas of great brightness contrast. An object is to provide photographic apparatus of the type in which the camera diaphragm is adjusted automatically in accordance with the current output of a photoelectric cell, and which includes devices adjustable to vary the current flow from a normal value when the scene includes areas of great brightness contrast and the important features of the scene are located in the brighter, or alternatively, in the darker areas of the scene. A further object is to provide photographic apparatus of the type stated, and specifically a motion picture camera, in which the devices for varying the current flow may be adjusted during the taking of a picture and without interrupting the camera operation.

These and other objects and advantages of the invention will be apparent from the following specification when taken with the accompanying drawing in which:

Figs. 1 to 5 are schematic diagrams illustrating embodiments of the invention;

Fig. 6 is a side elevation of a motion picture camera provided with a photoelectric system such as shown in Fig. 2;

Figs. 7 and 8 are a side elevation and a rear view, respectively, of a motion picture camera provided with a progressively adjustable control device as shown in Fig. 5;

Figs. 9 and 10 are a front elevation and a fragmentary side elevation, respectively, of a motion picture camera provided with another embodiment of the invention; and Fig. 11 is a diagram illustrating a further embodiment.

In the drawing, the numeral 1 identifies a current-generating photoelectric cell in circuit with a galvanometer or sensitive milliammeter, indicated by the coil 2, and with devices 3, 4 that may be adjusted, as indicated by the legends "Film speed" and "Shutter timing," respectively, to modulate the current flow in accordance with the emulsion speed of the film and with the shutter timing. These adjusting devices are well known and usually comprise adjustable resistances or an iris diaphragm over the photocell for adjusting the current flow to a value which, for certain preselected exposure factors and the average scene brightness, is a measure of another exposure factor. The photocell is provided with a mechanical or optical baffle for limiting the acceptance angle of the cell to substantially the image angle of the camera.

The moving coil system actuates the diaphragm mechanism 5 of the camera lens 6 through a mechanical coupling which is shown schematically in Fig. 1 as a rack 7 for engagement with the adjustable element, not shown, of the iris diaphragm. This illustration of a mechanical coupling is to be understood as purely schematic and other couplings may be employed, for example those illustrated in my prior Patent 2,051,061, "Exposure apparatus for cameras.", As therein described, the moving coil system may include a pointer 2' which affords a visual indication of the adjustment of the diaphragm blades.

In accordance with this invention, an additional control device is included in the photocell circuit to vary the current flow from the value appropriate for a normal average exposure to values appropriate for a correct exposure for the details in the brighter or in the darker areas of a scene of relatively great brightness contrast. The arrangement shown in Fig. 1 provides an adjustment to obtain a correct exposure for details within the shaded region. The spring switch 8 which normally completes a direct connection from one side of the photocell 1 to the coil 2 may be depressed to connect the resistance 9 as a series element in the photocell circuit. The switch 8 has a button 10 which projects through an opening in a part of the camera case 11.

The switch 8 normally stands in the position shown in solid line and the resultant current flow through the galvanometer coil 2 produces a deflection of the coil that effects the adjustment of the camera diaphragm 5 for an "average" exposure, i. e. according to condition 1. When button 10 is pressed to move switch 8 to the dotted line position, the resistance 9 is inserted in the circuit thus decreasing the current flow and causing coil 2 to take a new position in which the diaphragm 5 is set at a larger opening. The button 10 is so positioned on the camera case 11 that the operator may depress and release the button during the filming of a scene as the principal objects move into and out of the shaded areas. The closing of switch 8 to insert resistance 9 in the circuit corresponds to operation in accordance with condition 2.

Adjustment for operation under condition 3 may be afforded by a second switch-resistance unit, as shown in Fig. 2. The spring switch 11 is normally positioned to include the resistance 12 in the photocell circuit but may be depressed to complete a shunt circuit around the resistance. A push button 13 for actuating switch 11 projects through the exterior of the camera case. The Fig. 2 circuit also includes the switch resistance unit 8—10 of Fig. 1 and the variable devices for adjusting current flow in accordance with film speed and shutter timing.

The resistance 12 is normally included in the photocell circuit and the increase in current flow which results from actuation of switch 11 displaces coil 2 to effect a partial closing of the diaphragm 5. The effective exposure is thus reduced when switch 11 is actuated and the shorter exposure provides a proper rendition of the detail in the brightly illuminated areas of the scene. The exposure thus corresponds to the above condition 3.

The change in current flow may also be obtained by resistances which are shunted across the galvanometer coil 2. As shown in Fig. 3, the resistor 9' is normally excluded from the circuit by the spring switch 8' but may be shunted across the coil 2, thus reducing current flow through the coil by depressing spring switch 8'. The Fig. 3 circuit has the same operating characteristics as the Fig. 1 circuit.

The described circuits provide abrupt changes in the current flow as the fixed resistances are switched into and out of the circuit. The values of the resistances with respect to other circuit elements may be such that the current output is increased 100% above normal to obtain greater detail in the shaded sections, and reduced to 50% of normal current flow to obtain greater detail in brilliantly lighted sections of the scene.

The arrangements shown in Figs. 4 and 5 permit a progressive change in current flow and a simpler mechanical design. The control element comprises a resistor 14 along which the contact slide 15 may be moved by a handle 16. The slide 15 telescopes within a casing 17, and the slide and casing preferably have cooperating indentations 18 that engage when the slide is at the center and the two end positions. The slightly increased frictional resistance to a movement of the slide from these three positions provides an "indexing" action that enables the operator to determine the setting of the slide 15 without interrupting the taking of a picture to observe the position of the handle 16.

The resistor 14 is so calibrated that the current flow through the coil 2 is appropriate for an average or normal exposure when the slider 15 engages the center point of the resistor. The current flow is increased to obtain a further displacement of coil 2, thus providing a smaller aperture at the lens diaphragm 5, when the slider is moved to the illustrated fuel line position to eliminate the resistor from the path of current flow. Similarly, adjustment of the slider to the dotted line position places the entire resistance in the circuit to reduce the current flow and thus provides a larger diaphragm opening. The advantages of the progressively variable resistance are that the slider may be adjusted at a relatively slow rate to avoid abrupt changes in the density of the negative, and that the operator has a choice of the ratio by which the exposure is increased or decreased.

As shown in Fig. 5, the same electrical system may be incorporated in an arcuate resistor 19, pivoted contact arm 20 with knob 21, and a notched indexing plate 22.

The switch buttons 10, 13 for the Fig. 2 system may be arranged on the camera case 11 in the manner shown in Fig. 6. The lens mount 6' of the motion picture camera is near the center of the front wall and the lever 23 for controlling the spring motor, not shown, is on the right side. Buttons 10 and 13 project through the right wall in front of the starting lever and legends "for shade" and "for sunlight" are preferably placed adjacent the respective switch buttons. The devices for throttling current flow in accordance with film speed and frames per second are not shown but may be of any appropriate or desired design.

The motion picture camera shown in Figs. 7 and 8 has a single crank arm 20' that is mounted for movement along two different paths to effect the adjustment of the circuit resistance by an arcuate resistor such as shown in Fig. 5, and to actuate the release mechanism controlling the spring motor of the camera. The arm 20' is pressed towards the camera case 11, in the direction of arrow 24 of Fig. 8, to trip the release mechanism, not shown, put the camera in operation, and the arm 20' is connected to contact arm 20 that is adjusted angularly to vary the resistance, see Fig. 5. Legends are preferably placed on the camera case along the path of movement of the arm 20'. The usual view finder 25 is shown near the upper edge of the case.

The embodiment illustrated in Figs. 9 and 10 includes devices for adjusting the current output by controlling the effective area of the photocell 1. The front wall of the camera case 26 carries the lens mount 6' of the camera lens 6 and the galvanometer 2 is supported at the rear of the front wall to control the lens diaphragm. The photocell 1 and an iris diaphragm 27 are housed in a casing 28 on the front wall of the camera, and a handle 29 for adjusting the diaphragm extends through the casing. Symbols A, B, C on the casing identify the handle positions corresponding to diaphragm openings indicated by circles *a, b, c*, respectively. Position A corresponds to an intermediate size opening or "average" cell area and current output appropriate for an average exposure, and positions B and C correspond to maximum and minimum size openings, respectively, that increase or decrease the output current for exposures in the brighter or, alternatively, the shaded sections of the scene. The iris diaphragm is of course continuously adjustable for a progressive variation of the current output from its minimum to its maximum value at a given average scene brightness.

The desired variation in current output may also be obtained by the use of cells of different size or different current-generating capacity.

As shown in Fig. 11, auxiliary cells 1b, 1c, of greater and of less capacity than the "average" cell 1 may be substituted for cell 1 in the galvanometer circuit by a switch including a contact arm 30 and contact points 31. The cells are connected between the galvanometer coil 2 and switch points 31 that carry symbols A, B, C, signifying, as in the Fig. 10 construction, adjustments for normal, for bright light and for shade, respectively.

It is to be understood that there is considerable latitude in the design and construction of the current-varying elements that may be incorporated, in accordance with this invention, in a photoelectric system comprising a photocell, a galvanometer and means for adjusting current flow to meet relatively fixed exposure conditions, i. e. film speed and picture frames per second or shutter speed.

I claim:

1. In a motion picture camera, the combination with an adjustable lens diaphragm, photoelectric means, an instrument electrically connected to said photoelectric means and having a moving system mechanically connected to said diaphragm to adjust the same, and regulating means having an element adjustable to vary the current flow from said photoelectric means to said instrument; of a control member mounted for adjustment along one path to actuate the camera release mechanism, said control member being connected to said element of the regulating means and mounted for adjustment along a second path of movement to actuate said element.

2. In a motion picture camera, the invention as claimed in claim 1, wherein said regulating means is a resistance, and the adjustable element thereof is a control arm movable along the resistance.

HANS FERDINAND TÖNNIES.